United States Patent [19]

Hara et al.

[11] Patent Number: 4,487,097
[45] Date of Patent: Dec. 11, 1984

[54] METHOD AND MACHINE FOR CUTTING BY AUTOMATIC BAND SAW

[75] Inventors: Toshio Hara; Nobuo Hara, both of Hyogo, Japan

[73] Assignee: Hiromichi Hara, Tottori, Japan

[21] Appl. No.: 430,533

[22] Filed: Sep. 30, 1982

[30] Foreign Application Priority Data

Sep. 16, 1982 [JP] Japan .................. 57-161786

[51] Int. Cl.³ .............. B23D 53/04; B23D 55/08
[52] U.S. Cl. ............................ 83/56; 83/788; 83/789; 83/801
[58] Field of Search .............. 83/788, 789, 794, 796, 83/797, 798, 799, 800, 801, 809–813, 56; 125/21

[56] References Cited

U.S. PATENT DOCUMENTS 2,883,736  4/1959  Crane .................. 83/800
4,127,045  11/1978 Blucher ............... 83/796
4,160,397  7/1979  Bertini ................ 83/661

FOREIGN PATENT DOCUMENTS 3102766  2/1982  Fed. Rep. of Germany ........ 83/798
107729   7/1982  Japan ........................ 83/789

Primary Examiner—James M. Meister
Attorney, Agent, or Firm—Gabriel P. Katona

[57] ABSTRACT

Method and machine for cutting by automatic band saw wherein the workpiece is machined in such a manner that the machining tracks of the workpiece describe circular arcs and the cutting edge of the band saw contacts only part of the workpiece to prevent generation of loadings between the teeth of the saw. The oscillating body in which the band saw is housed is held capably of performing oscillating and tilting motions in the left and right and upward-and-downward motions and the band saw descends, performing oscillating and tilting motions, or the latter performs alternately the oscillating and tilting motions with the descending motions repeatedly, to cut the workpiece. Either a crank mechanism or a hydraulic cylinder is used for driving the oscillating and tilting motions, and a hydraulic cylinder and a cam mechanism are used for driving the upward and downward motions.

15 Claims, 14 Drawing Figures

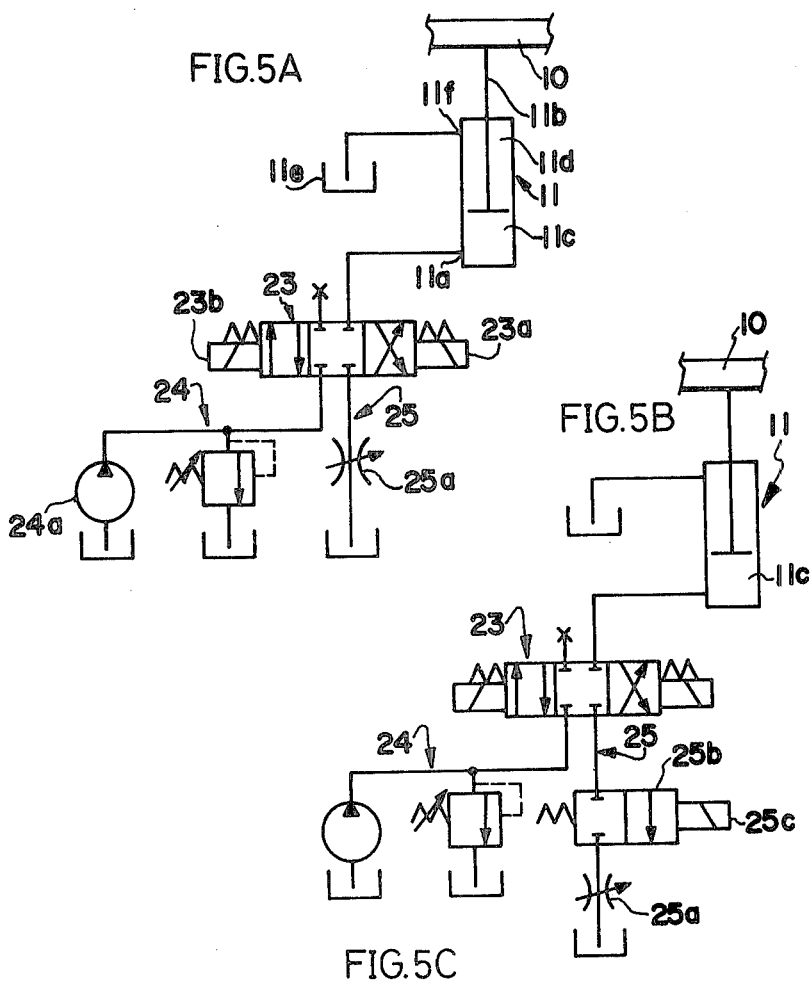
FIG.5A
FIG.5B
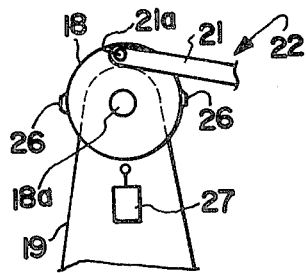
FIG.5C

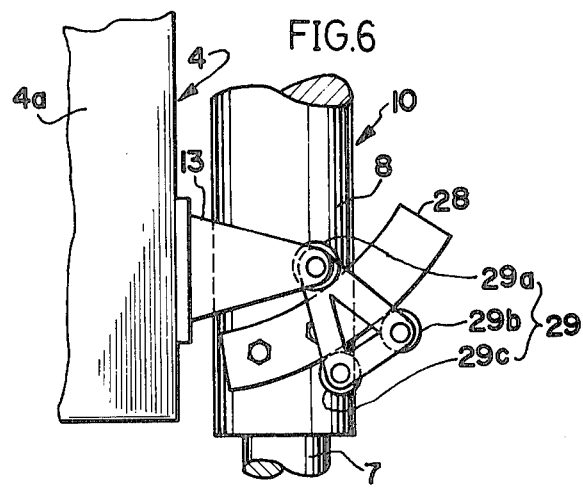
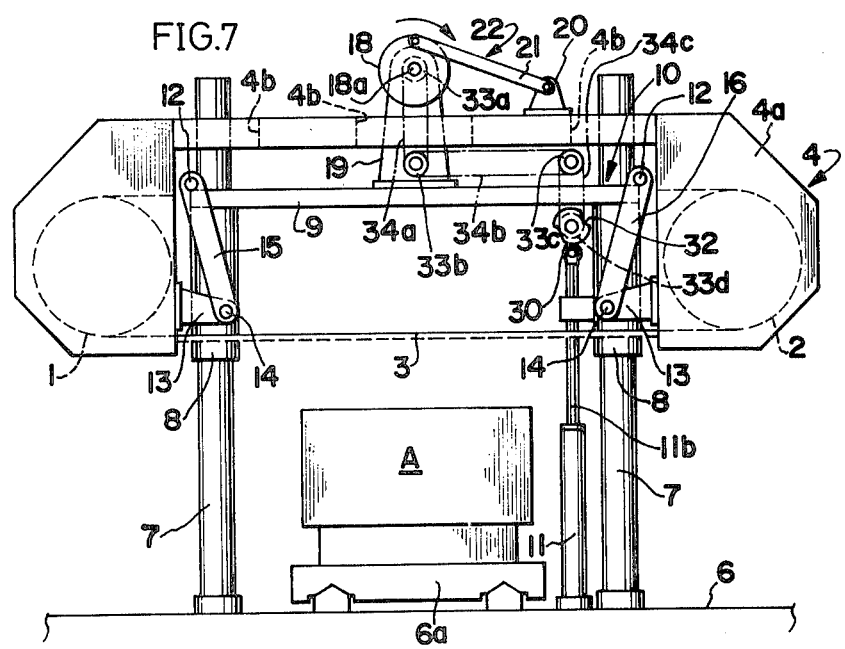

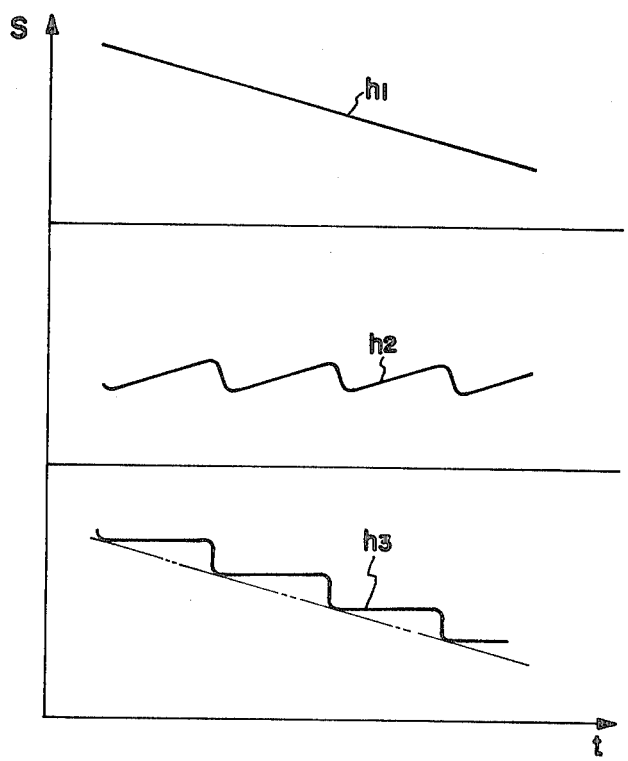

METHOD AND MACHINE FOR CUTTING BY AUTOMATIC BAND SAW

BACKGROUND OF THE INVENTION

The present invention relates to an improvement of a method of so called automatic band saw cutting and a machine for practicing the method, in which a desired mechanical cutting of a metallic or nonmetallic workpiece is performed by gradually lowering an endless belt-like flexible band saw made of steel and the like, bridging two pulleys and rolling around said pulleys, while forcing said band saw to carry out a continuous forced-circulation running.

An outline of a conventional machine for cutting by a band saw is shown in FIG. 1, in which a band saw 3, bridging two pulleys 1 and 2 and rolling around said pulleys in a form of an endless belt is made to perform continuously forced-circulation running by a motor for machining connected to one of said pulleys and to descend to cut a workpiece placed under the band saw 3. Therefore, according to this method, machining tracks of the machining groove of the workpiece A are linear. According to this conventional method, the length of machining of the workpiece A by the band saw 3, namely tne width of machining l equals to the width L of the workpiece A, and when this width is relatively great, chips generated in the machining groove as the machining motions goes on accumulate between each tooth of the saw until a state of so called loading that will impede normal machining motions is presented. The greater the width of machining l of the workpiece A is, and the poorer the machinability of the material of the workpiece is, for example, stainless steel, more easily loading is generated. This loading increases machining resistance and not only shearing heat is produced to lower in the machining efficiency but also the life of the saw is shortened, which will cause the impossibility of machining. Therefore, according to the conventional method, a motor of a large size is used to run the band saw taking in consideration of lowering in the efficiency of the machine due to generation of loading. At the same time, it has been required to reduce the machining speed to a great extent for alleviating generation of loading, which means that its mechanical efficiency and working efficiency are very low besides of the necessity of restricting the size of the workpiece A.

ABSTRACT OF THE INVENTION

The present invention has been made in view of those defects mentioned above. That is, the invented machine performs cutting of a workpiece in such a manner that the cross section of the machining groove describes a circular arc to shorten the width of machining l and thereby not only generation of loading as well as lowering in the mechanical efficiency and operating efficiency is prevented, but also cutting of a large-sized workpiece has come to be possible.

The object of the present invention is to provide a method and machine for cutting by automatic band saw in which generation of loading is prevented.

Other object of the present invention is to provide a method and machine for cutting by automatic band saw which not only prevent loading but also allows to perform cutting at high speeds, uniformalizing the amount of machining with the passage of time.

Another object of the present invention is to provide a method and machine which prevent generation of loading and are suitable for uniformalizing the amount of machining with the passage of time.

The foregoing and other objects of the present invention will be apparent from the accompanying specification and claims.

BRIEF DESCRIPTION OF THE DRAWINGS

FIG. 5A is a circuit diagram showing an embodiment of the oil hydraulic circuit in the machine for cutting by automatic band saw according to the present invention;

FIG. 5B is a circuit diagram similar to FIG. 5A in another embodiment;

FIG. 5C is a front elevation showing an embodiment of a signal detection device to obtain timing signals of the operation of the directional control valves;

FIG. 6 is a front elevation showing another embodiment of the oscillating member in the machine according to the present invention;

FIG. 7 is a front elevation showing the second embodiment of the machine according to the present invention;

FIG. 10 is a view for explaining the main feed member, the auxiliary feed member and the synthesized motion between them in the embodiments of the present invention.

DETAILED DESCRIPTION OF THE INVENTION

Figure 1:
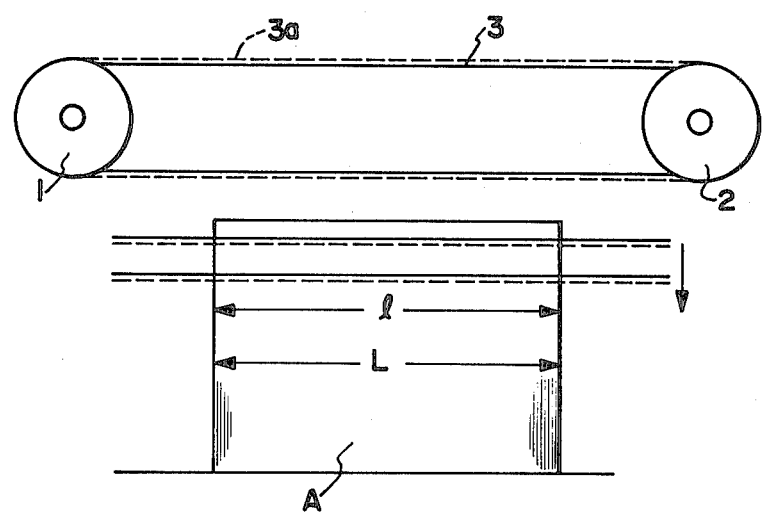
FIG. 1 is an explanatory diagram showing the outline of a conventional method of cutting by band saw.

The embodiments of the invention will be explained by reference to the accompanying drawings wherein like parts in each of the several figures are identified by the same reference character.

Figure 2A:
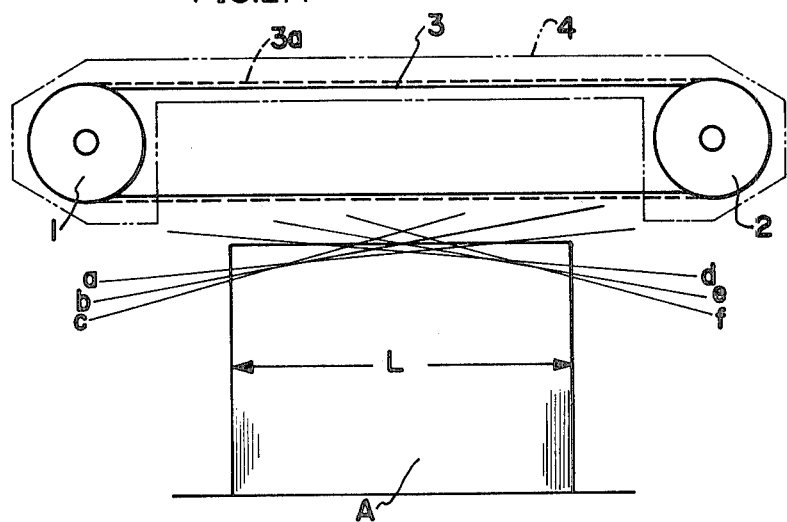
FIG. 2A is an explanatory diagram showing the outline of the method for cutting by automatic band saw according to the present invention.

First, the method to machine a workpiece according to the present invention will be described. As shown in FIG. 2A, an oscillating body 4 comprising a pair of pulleys 1, 2 and a band saw 3 gives in the operating state of the saw 3 an oscillating and tilting motion from the horizontal position in the initial stage to the left in the order of a→b→c with gradually increasing angles, then, after returning to the initial horizontal position by inclining to the opposite side, gives an oscillating action with gradually increasing angles to the right in the order of d→e→f, then return to the initial horizontal position. The machining is performed by repeating said process and lowering the whole oscillating body 4 at a suitable speed or with a suitable timing.

Figure 2B:
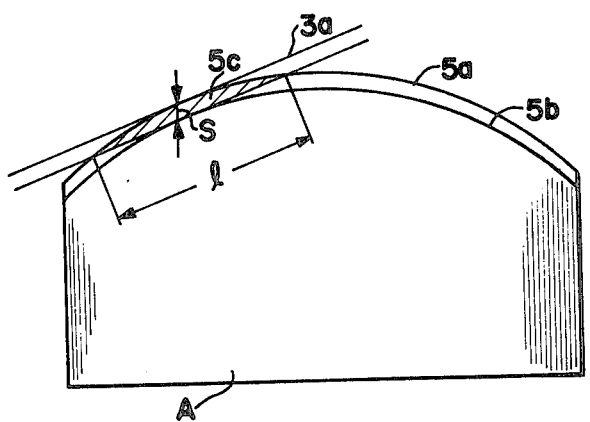
FIG. 2B is an explanatory diagram showing the cutting process according to the method of the present invention.

That is, when the oscillating body 4 is giving only oscillating actions to the left and right the tracks of the cutting edge 3a of the band saw 3 describes a curve 5a as shown in FIG. 2B, for instance. In case a workpiece A being placed under the machine, the machining tracks in the machining groove also describes the same curve 5a. At this state, a part of the curve 5a is cut away by an arc-shaped portion 5c by lowering of the whole oscillating body 4 by s which is a feed amount by a slight distance. The oscillating and tiling motions of the oscillating body 4 to the left and right cover the whole periphery of the curve 5A and finally machining for the whole periphery by a feed amount s is performed to form a new curve 5b.

In the course of this machining, the cutting edge 3a contacts only a part of the workpiece A. The length of said part corresponds to the width of machining l. In this case, the width of machining l is determined by the shape (the radius of curvature) of the curve 5a and the feed amount s, and said width may be reduced sufficiently irrespective of the size of the workpiece A. Therefore, chips generated in the machining groove, if they pack each of the tooth of the saw 3, drop immediately to prevent generation of loading. In FIG. 2B, each amount of machining seems to be equal apparently over the whole periphery of the curve 5a. But in fact, the amount of machining gradually reduces as it draws near the end portion of the curve 5a until it dwindles into zero at both extreme ends. Therefore, in practical machining, it will be advantageous to lower the saw and enter the workpiece at both ends, that is, at places near the points and the very moment where and when the tilting angle of the oscillating body reaches a maximum at both ends.

Figure 3:
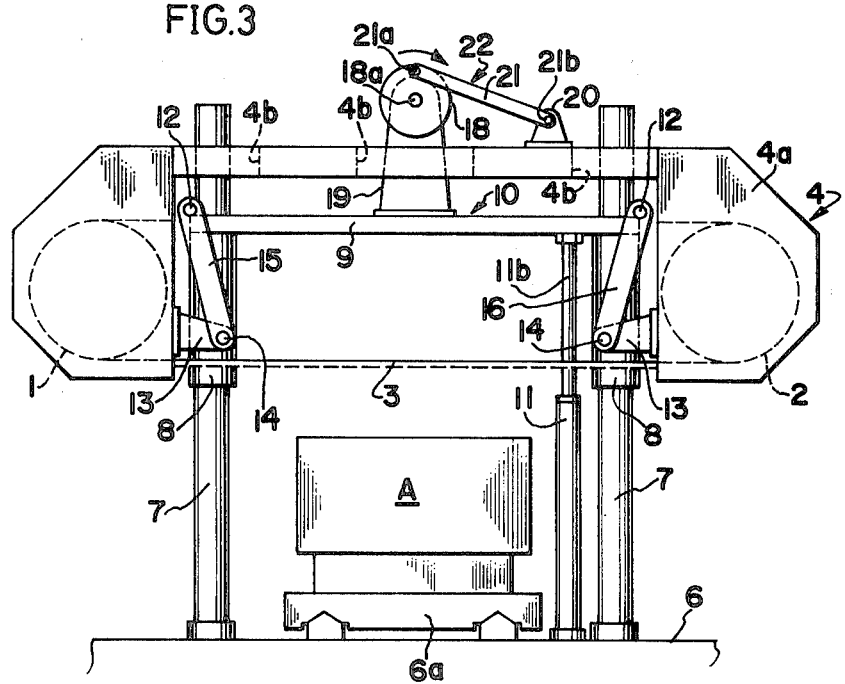
FIG. 3 is a front elevation showing the first embodiment of the method for cutting by automatic band saw.

FIG. 3 shows a front elevation showing the first embodiment of the present invention, wherein numeral 7 denotes guide stanchions respectively provided upright on a horizontal base 6, while numeral 8 denotes guide sleeves. Each of the guide sleeve 8 fits slidably on the corresponding stanchion 7. A horizontal beam 9 is provided on the upper ends of the guide sleeves 8 so as to connect both guide sleeves. Therefore, a descending body 10 which is an integrated structure comprising guide sleeves 8 and a beam 9 is capable of descending vertically along stanchions 7. Between the base 6 and the beam 9, a hydraulic cylinder 11 is provided in such a manner that it parallels the stanchion 7 with respect to its extending direction. Said hydraulic cylinder 11 functions as a feed member during machining and as a member to drive the descending body 10 upwards when machining has completed. In a housing 4a, a pair of pulleys 1, 2, a motor for machining (not shown in the drawings) which is connected to one of the pulleys for rotation and drive, and the band saw 3 installed in the form of an endless belt around the pulleys 1, 2 are housed, and the oscillating body 4 includes all of them. To the descending body 10, the oscillating body 4 is held capably of performing the oscillating and tilting motions by suspending arms, 15, 16, each of which is connected over oscillating shafts 12 and 14, the former being provided near the guide sleeve 8 of the descending body 10, the latter on brackets that are projectingly provided from near pulleys 1, 2 of the oscillating body 4. On the upper surface of the beam 9 of the descending body 10, a crank plate 18 is mounted by a bracket 19, said crank plate being rotatably driven by a motor for oscillating. Between the eccentric position of the crank plate 18 and a bracket 20 provided on the oscillating body 4, a connecting rod 21 is rotatably connected to shafts 21a, 21b respectively. The oscillating drive member 22 is constructed by the motor for oscillating 17, the crank plate 18, the connecting rod 21 and shafts 21a and 21b.

Now more detailed explanations will be given. The descending body 10 together with the oscillating body 4 goes down due to its empty weight, and the hydraulic cylinder 11 controls said descending speed or timing, or, in reverse, drives to elevate. FIG. 5A is an example of the oil hydraulic circuit to control the hydraulic cylinder, in which to a port 11a on the head side of the hydraulic cylinder 11, a directional control valve 23 is connected to select an admission flow path 24 or drainage flow path 25. An oil hydraulic pump 24a is connected to the admission flow path 24, and said pump supplies oil into a cell 11c on the head side to drive to ascending of the descending body 10 via a piston rod 11b. To the drainage flow path 25, a pressure compensated flow control valve 25a is connected, which controls the descending speed of the descending body 10 by restricting the back pressure generated in the cell 11c on the head side. Either a pressure compensated flow control valve or a pressure-temperature compensated flow control valve may be used as this pressure compensated flow control valve 25a. Another type of valve that can be operated by remote control through electric signals (for example, signals which are inversely proportional to the amount of load exerted on the band saw during machining). A port 11f on the rod side of the hydraulic cylinder 11 is connected to a pressure oil tank 11e. An alternative construction is such that the port 11f on the rod side is selectively connected to the oil hydraulic pump 24a via directional control valves and to drive forcedly the descending body 10 to descend. Also a ram cylinder may be used as the hydraulic cylinder 11. Therefore, in case the oil hydraulic circuit shown in FIG. 5A is adopted, the descending body 10 will ascend relatively at high speeds with a solenoid 23a of the directional control valve 23 ON, and the descending body goes down at speeds regulated by the pressure compensated flow control valve with another solenoid 23b ON.

FIG. 5B shows other example of the oil hydraulic circuit. This figure is an addition of a directional control valve 25b into the drainage flow path 25, and said control valve is for regulating the timings for the descending body 10 to going down or the descending dimensions of the descending body, intercepting the flow paths as occasion demands. Said directional control valve 25b works only at places near the points and the very moment where and when the tilting angle of the oscillating body reaches a maximum at both ends. An example of a signal detection device for this purpose is shown in FIG. 5C, in which projections 26 are provided at the position where the shaft 21a on the outer peripheral surface of the crank plate 18 is provided and at shifted positions at right angles with the position where the shaft 21a is provided in opposite directions, and a limit switch 27 is provided at a lower position of a crank shaft 18a. Said limit switch operates when it contacts the projections 26. In the circuit under description now, a solenoid 25c on the directional control valve 25b is constructed to hold ON for a limited time (not shown in the drawings) due to the detection signals of the limit switch 27. Independently of this, it may be constructed in such a manner that the time range wherein this solenoid 25c is keeping its ON state is increased and decreased in inverse proportion to the magnitude of the load exerted on the band saw upon machining the workpiece. Also it may be constructed in such a manner that the descending dimension of the descending body 10 is controlled by providing a displacement converter such as a differential transformer or a pulse generator.

Also it is possible to use a pressure compensated flow control valve 25a which is capable of controlling the flow by the magnitude of electric signals, which is regulated correspondingly to the state of the oscillating and tilting motion of the oscillating body 4 or the running speed and the like of the band saw 3 to obtain best conditions of machining. The directional control valve 23 is also usable as the directional control valve 25b, and it is further possible to obtain substantially the same effect as in the oil hydraulic circuit shown in FIG. 5B without using the directional control valve 25b and by regulating only the pressure compensated flow control valve 25a. Therefore, in case the oil hydraulic circuit shown in FIG. 5B is adopted, the descending body 10 goes down by a certain dimension at a speed adjusted by the pressure compensated flow control valve 25a only at places near the points and the very moment where and when the tilting angle of the oscillating body 4 reaches a maximum at both ends. The hydraulic cylinder 11 used here may be a digitized servo cylinder or a combination of an electrically operating pulse motor and a worm gear instead of the hydraulic cylinder. When the hydraulic cylinder is strong enough, it may be also used as a guide stanchion.

Figure 4:
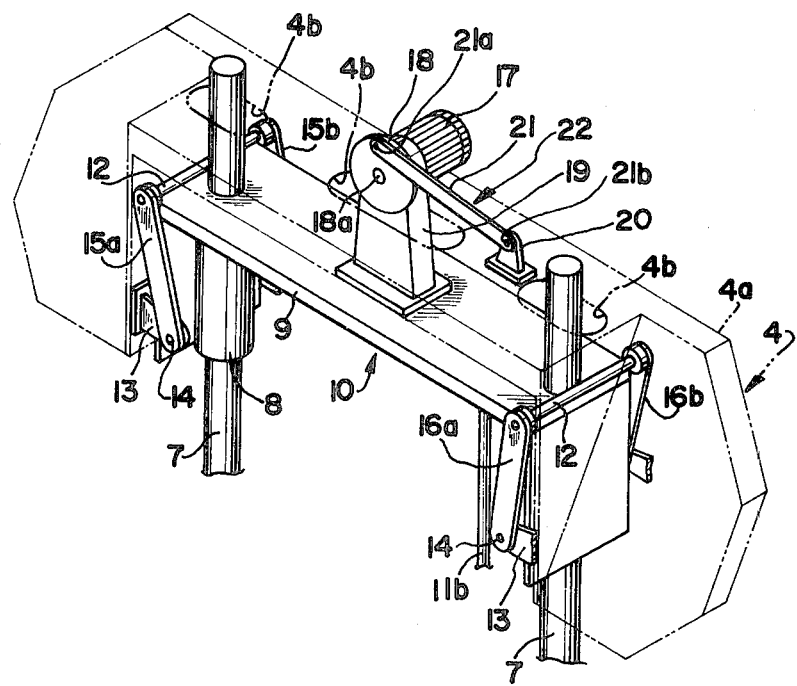
FIG. 4 is a perspective view similar to FIG. 3.

In order to cut a workpiece A on a plane, it is necessary that the portion to be machined by the band saw 3 always be located on the cutting plane. Therefore, as shown in FIG. 3 or FIG. 4, the oscillating shafts 12, 14 are provided with their axial lines cutting the plane including those of the guide stanchions 7 at right angles. In a suspending arm 15, a pair of arm members 15a and 15b respectively rotate integrally, because 15a is connected to 15b by the oscillating shaft 12a that are rotatable. When the oscillating body 4 rests in a horizontal position, it is preferable that the suspending arms 15, 16 be located symmetrically with respect to each other, each arm inclining at an angle ranging from several to some sixty degrees, preferably about 45 degrees, to perpendicular. FIG. 6 shows another embodiment of the oscillating member, in which three guide rollers 29a, 29b, 29c rotatably contact a rail for oscillation 28 provided on the guide sleeve 8 with the upper and lower surfaces of said rail 28 between. The shaft of one guide roller 29a is held by a bracket 13 provided on the oscillating body 4. Accordingly, the guide roller 29a moves along the upper surface of the rail for oscillation 28, and, by providing guide rollers and a rail for oscillation at the symmetrical position of the descending body 10 and the oscillating body 4, the oscillating body 4 is held to the descending body capably of performing oscillating and tilting motions. A sliding member which is capable of oscillating along the rail 28 may be used instead of the guide roller 29, thereby a desired form of oscillating and tilting motion can be performed according to the shape of the rail 28. Another embodiment of the oscillating member may be a shaft (not shown in the drawings) which connects rotatably the descending body 10 and the oscillating body 4 at a place in the center area.

In FIGS. 3 and 4, the connecting rod 21 of the oscillating drive member 22 should have a length equal to the distance between the crank shaft 18a and the shaft 21b of the bracket 20, or, a length that allows the oscillating body 4 to rest in a horizontal position when the shaft 21a of both the crank plate 18 and the connecting rod 21 is located immediately above or below the crank shaft 18a. By perforating radially a plural number of holes on the crank plate 18, the shaft 21a can be fitted in a suitable hole to vary the oscillating and tilting angle of the oscillating body 4. An arm-shaped crank may be also used instead of the circular crank plate 18. As other embodiment of the oscillating drive member 22, the oscillating drive member 22 may be installed between the descending body 10 and the oscillating body 4 capably of rotating substantially horizontally, using an expandable fluid pressure cylinder, or, the oscillating shafts 12 of the suspending arms 15, 16 which has been referred to as the oscillating member may be rotatably provided. Numeral 4b denotes holes provided on the oscillating body 4 in order to avoid the mechanical interference, while numeral 6a denotes a table for placing the workpiece on provided on the base 6.

Figure 9A:
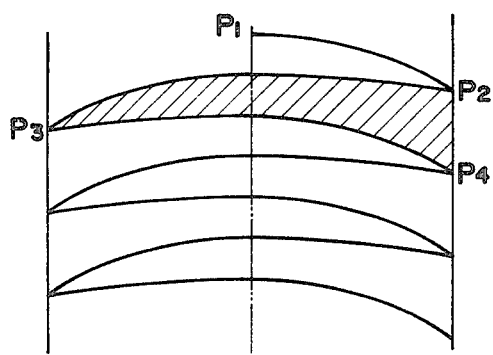
FIG. 9A is a view showing the machining tracks when the feed member has performed only feeds at a constant speed in the embodiments of the present invention.

Now explanations about the working effects of the first embodiment will be given. First, in an embodiment in which the oil hydraulic circuit shown in FIG. 5A is used, as shown in FIG. 3 or FIG. 5A, the motor for oscillating 17 is driven, the directional control valve 23 in the oil hydraulic circuit is changed over to the drainage flow path 25 side, and the running band saw 3 descends at a constant speed describing circular curves as shown in FIG. 9A, and moves on a track P1→P2→P3→P4. Therefore, an oscillating and tilting motion by the oscillating body 4 machines a portion surrounding with points P2, P3 and P4. This machining is repeatedly performed as a result of the oscillating and tilting motion by the oscillating body in the left and right sides until finally the workpiece A has been cut. In this machining process, no loading is occurred between teeth, because the width of machining is small as mentioned above. Therefore, only a required amount of load for machining exerts on the motor for machining which runs the band saw 3, which results in a high mechanical efficiency and long life of the band saw 3. Furthermore, it is possible to increase the descending speed of the band saw 3, that is, the cutting speed, and the working efficiency of the machine. Still more, even a large-sized workpiece can be cut efficiently. According to this embodiment, the advantages mentioned above are obtained with simple constructions. On the other hand, irregularities can be seen with respect to the amount of machining, as seen in FIG. 9A. That is, in the initial stage of each oscillating and tilting motion, only a small amount of machining has been done. Therefore, if the amount of machining is uniformalized to obtain usually the maximum of amount of machining, the cutting speed may be increased.

Figure 9B:
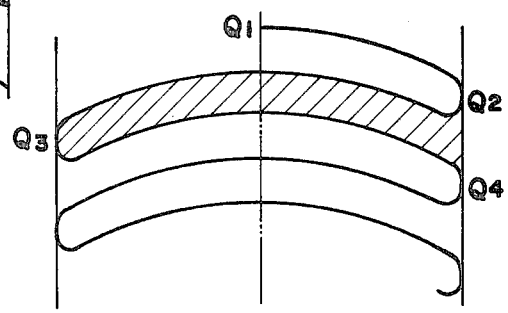
FIG. 9B is a view showing the machining tracks when the feed member has performed feeds by a given dimension only at places near the points and the very moment where and when the tilting angle of the oscillating body reaches a maximum to the right and left in the embodiments of the present invention.

Whence, other embodiment of the oil hydraulic circuit as shown in FIG. 5B will be explained. In this embodiment, the descending body 10 descends not at a given speed but by a given dimension only at places near the portions and the very moment where and when the tilting angle of the oscillating body 4 reaches a maximum at both ends. As a result, as shown in FIG. 9B, the running band saw 3 descends by a given dimension after describing a circular curve to describe a track Q1→Q2→Q3→Q4. Therefore, one oscillating and tilting motion by the oscillating body 4 machines a portion surrounded with points Q2, Q3 and Q4. In this machining, the amount of machining is uniformalized and the maximum of amount of machining is obtained. In FIG. 9B, it seems apparently that the amount of machining increases to a great extent at the side Q2 and Q4. The actual amount of machining at these portions, however, is remarkably decreased one as mentioned above. Moreover, the oscillating and tilting motion at both ends is slower than at the center area because of the crank mechanism used as the oscillating drive merber 22. Therefore, it results in that the thrust for machining at places near the points and the very moment where and when the tilting angle of the oscillating body reaches a maximum at both ends comes to be easier and the amount of machining by the band saw 3 with the passage of time is uniformalized one. According to this embodiment, the machining speed and the operating efficiency are remakably increased, as well as obtaining many advantages as a result of preventing from occurrences of loading between teeth of the saw.

Figure 8:
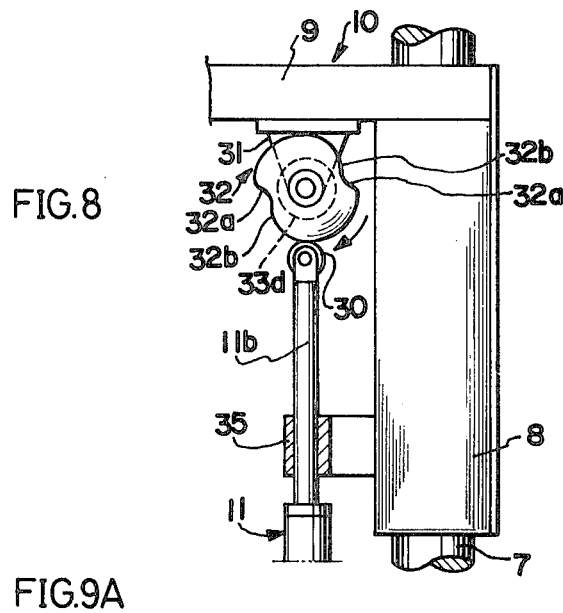
FIG. 8 is an enlarged view of the principal part of the plate cam portion shown in FIG. 7.

FIG. 7 is a front elevation showing the second embodiment of the machine according to the present invention, while FIG. 8 is an enlarged view of the principal part thereof.

In FIG. 7 and FIG. 8, like parts in the several figures relating to the first embodiment mentioned above are identified by the same reference character and explanations about them are omitted. At the top of the rod 11b of the hydraulic cylinder 11, a roller 30 is rotatably provided, and the outer peripheral edge of the plate cam 32 rotatably provided on the lower surface of the beam 9 of the descending body 10 through a bracket 31 contacts said roller 30. The plate cam 32 is connected to the crank shaft 18a through sprockets 33a, 33b, 33c and 33d, and chains 34a, 34b and 34c to synchronize with the rotation of the crank plate 18 to rotate at the same speed.

Now explanations will be given in more detail. In FIG. 8, the rod 11b of the hydraulic cylinder 11 is fitted slidably on the inner surface of the guide arm 35 projectingly provided on the guide sleeve 8, and thereby the hydraulic cylinder 11 is held perpendicularly. The axial line of the plate cam 32 is on that of the hydraulic cylinder 11, and through said plate cam 32 the hydraulic cylinder 11 bears the gravity of the descending body 10 and the like to hold them. The plate cam 32 is provided with concaved portions 32a symmetrically with respect to each other on its outer periphery and smoothly curved portions 32b in areas adjacent to said concaved portions with their radius increasing continuously. Said plate cam is provided at a position where either of the concaved porions 32a is ridden in by the roller 30 only at places near the points and the very moment where and when the tilting angle of the oscillating body reaches a maximum at both ends. Accordingly, a rotation of the crank plate 18 necessarily accompanies an oscillating and tilting motion by the oscillating body 4 and an upward and downward motion with respect to the roller 30 by the descending body 10. The upward and downward motion with respect to the roller 30 by the descending body 10 reaches the maximum of amount of descending when the tilting angle of the oscillating body reaches a maximum at either end. Then the descending body gradually ascends, and its upward and downward motion reaches again the maximum of amount of descending when the tilting angle of the oscillating body reaches a maximum at another end. These processes are repeated thereafter. At this state, the hydraulic cylinder 11, controlled by the oil hydraulic circuit as shown in FIG. 5A, descends and the descending body 10 performs a motion synthesized from the motion of the hydraulic cylinder 11 and that of the plate cam 32. That is, let the hydraulic cylinder 11 which descends at a constant speed be a main feed member and the plate cam 32 which rotates synchronously with the crank plate 18 be an auxiliary feed member. Then, in FIG. 10, a graph with time t as abscissa and the travel amount s as ordinate, h1 and h2 show travels of the main feed member and the auxiliary feed member respectively when each of them moves independently. Synthesized motions from them are shown by a curve h3. Therefore, the descending body 10 necessarily performs the motions as shown by the curve h3. This graph shows a fact that the descending body 10 descends by a prescribed dimension only at places near the points and the very moment where and when the tilting angle of the oscillating body 4 reaches a maximum at both ends. According to this second embodiment, it comes to be possible to simplify the oil hydraulic control circuit, because the hydraulic cylinder, in spite of performing descending motions at a constant speed, can perform substantially the same motions as those when said cylinder is controlled by the oil hydraulic circuit in the first embodiment as shown in FIG. 5B. Moreover, by varying the shape of the plate cam 32, it is possible to obtain best conditions for machining correspondingly to the state of the oscillating and tilting motions by the oscillating body 4, the descending speed of the hydraulic cylinder 11 or the running speed of the band saw 3 and so on. Relating to this construction, it is also possible to arrange these different kinds of plate cams on the same axial line to select one each time from among these plate cams. The plate cam 32 may be forced with the areas on its outer periphery to the concaved portions 32a having smooth curves whose radius reduces gradually as they draw near the concaved portions. Still more, by combining the plate cam 32 of such a shape with an appropriate descending speed of the hydraulic cylinder 11, it is possible to perform machining, repeating the steps of allowing the descending body 10 to descend by a suitable dimension, to ascend slightly, then to descend.

In this embodiment, two pairs of concaved portions 32a and curved portions 32b are formed on the outer periphery of the plate cam 32. But the same effects will be obtained by forming only one concaved portion and curved portion and setting the plate cam 32 to rotate faster than the crank plate 18 by two times. One of various alternatives is to permit the plate cam 32 to rotate synchronously with the oscillating shafts 12 of the suspending arms 15, 16 instead of synchronizing with the crank plate 18. Incidentally, the shape of the concaved portions 32a as shown in FIG. 8 is exaggerated one, and actually in some cases it lacks definite concavities. For instance, assuming that a machining feed is performed by 0.6 mm by one oscillating and tilting motion, the dimension of a concaved portion equals to 1.5% of the radius of the outer circle of the plate cam 32 when the radius of the plate cam 32 is 40 mm or so, which will result in that the plate cam 32 presents an appearance almost alike to a mere disc lacking such portions definitely distinguishable as concavities. Also a hydraulic cylinder (not shown in the drawings) with a very small amount of stroke, hydraulically controlled correspondingly to the oscillating and tilting motions of the oscillating body 4, may be used instead of using the plate cam 32 as the auxiliary feed member. In this case, a new oil hydraulic circuit is required, but there is an advantage that the machine can be controlled more easily as a whole and at the same time the machine may not be damaged definitely even when the auxiliary feed member comes to be in trouble, because the hydraulic cylinder 11 which is the main feed member operates at a constant speed and another hydraulic cylinder with a very small amount of stroke which is the auxiliary feed member alone is controlled by a complicated operation.

In this embodiment, the guide stanchion 7 is provided vertically. It, however, may be provided inclinatorily. The oscillating body 4 performs the oscillating and tilting motions in both directions from a horizontal position. It, however, may be constructed so as to perform the motions from an inclined position. Further, the guide stanchion 7 may be provided horizontally so that the oscillating body 4 performs the oscillating and tilting motions from a vertical position, deteraining the shape of the oscillating member and the positions of the oscillating shafts 13, 14 properly and supplying oil into a cell on the head side 11d of the hydraulic cylinder 11.

As mentioned hereinbefore, in the present invention, an oscillating body in which a pair of pulleys and a band saw are housed is held capably of oscillating and tilting to an descending body which is capable of performing upward and downward motions along guide stanchions. And the present invention aims at cutting a workpiece by integrating the descending motions of the descending body and the oscillating and tilting motions in the left and right of the oscillating body to permit the band saw to perform the descending motions while performing oscillating and tilting motions or to repeat the oscillating-and-tilting motions alternately with the descending motions. As a result, generation of loadings between the teeth of the saw may be avoided, so that a motor of a small size will suffice as the motor for driving the band saw, which will be economical. In the machine according to the present invention, the band saw can endure long and the machining speed can be increased, so that the working efficiency is highly increased. Also in the machine according to the present invention, a large-sized workpiece and poorly machinable stainless steel material are easily cut. In the machine according to the present invention, the machining speed is more increased because the amount of machining is uniformalized due to a construction wherein the descending body descends for machining only at places near the points and the very moment where and when the tilting angle of the oscillating body reaches a maximum at both ends. The machine according to the present invention may be controlled more easily and will not suffer from definite damages even when the auxiliary feed member comes to be in trouble, because in the machine the main feed member carries out the descending motions at a constant speed, and the auxiliary feed member carries out the upward and downward motions synchronously with oscillating and tilting motions of the oscillating body and the descending body is permitted to descend for machining by the motions synthesized from the motions of the main feed member and those of the auxiliary feed member.

Still more, connecting the pressure compensated flow control valve and the directional control valve for intercepting the drainage flow path in series in said flow path connected to the fluid pressure admission and drainage port of the cell on the head side of the fluid pressure cylinder makes it easier to control the hydraulic cylinder and also makes it possible to obtain best conditions for machining. Furthermore, when the machine comprises, as the feed member, a fluid pressure cylinder installed in parallel with respect to a guide stanchion with one end thereof fixedly on the base and a plate cam which rotates synchronously with the oscillating and tilting motions of the oscillating body with its outer peripheral edge slidably contacting the other end of said fluid pressure cylinder and its shaft rotatably mounted to the descending body, which rotates synchronously with the oscillating and tilting motions of the oscillating body, complicated control of the descending body will be possible in spite of its simple construction. Also, by adopting such a shape for the plate cam with a concaved portion at at least one portion on the outer peripheral edge and smoothly curved portions with their radius increasing at portions adjacent to said concaved portion, the amount of machining is uniformalized, and it is possible to obtain high machining speeds in spite of its simple construction. Also, by adopting suspending arms which rotatably connect the oscillating shafts provided at both ends of said descending body and another oscillating shafts provided at both ends of said oscillating body as the oscillating member, the oscillating body can be held with certainty in spite of its simple construction, and by selecting proper lengths and angles of the suspending arms, it is possible to obtain most fitted oscillating and tilting motions. Furthermore, by a construction including as the oscillating body rails for oscillation provided on both left and right sides of the descending body and one or a plurality of guide rollers which are provided on both left and right sides of the oscillating body and capable of moving along said guide rollers, it is possible to obtain desired oscillating and tilting motions of the oscillating body. Also, by a construction wherein the oscillating drive member is a crank mechanism including a crank which is mounted to said descending body and capable of rotating and a connecting rod which connects rotatably a shaft provided at an eccentric position of said crank and another shaft provided to said oscillating body, it is possible to obtain the maximum tilting angle variously in spite of its simple construction, and this construction has such an effect as easiness of entering for machining at places near the points where the tilting angle of the oscillating body reaches a maximum because the motions slows down there.

What is claimed is:

1. A method for cutting a workpiece by automatic hand saw, said band saw being an endless belt between a pair of pulleys, the nethod comprising the steps of: (a) securing the workpiece beneath the band saw, (b) causing the band saw to descend to proximate the workpiece, and (c) cutting the workpiece, said workpiece being cut by: (i) progressively tilting said band saw to cut an arc-shaped track in the workpiece, (ii) causing said band saw to descend a feed amount when the band saw is proximate the periphery of the workpiece, the angle of the band saw relative to horizontal then being at a maximum, and (iii) iteratively causing one or more additional arc-shaped tracks in the workpiece by oscillating the band saw in such progressively tilting motions, said band saw descending said feed amount each time the band saw is proximate the periphery of the workpiece, the angle of the band saw relative to horizontal then being at a maximum.

2. The method of claim 1 wherein the band saw and the pulleys are housed in an oscillating body.

3. The method of claim 2 wherein the oscillating body is held to a descending body adapted for ascent and descent along guide stanchions.

4. A method for cutting by automatic band saw as defined in claim 3 wherein said descending body descends by motions synthesized from a main feed member which performs the descending motions at a constant speed and an auxiliary feed member which performs the upward and downward motions synchronously with the oscillating and tilting motions of said oscillating body to machine the workpiece.

5. The method of claim 1 wherein the oscillating and tilting motions are performed alternatively with the descending motion by integrating the descending motion and the oscillating and tilting motions of the band saw in both directions to cut the workpiece.

6. A machine for cutting a workpiece by automatic band saw, the machine comprising: (a) an oscillating body, said oscillating body housing said band saw, the band saw being an endless belt between a pair of pulleys, (b) a descending body, (c) substantially vertical guide stanchions secured to a base therefor, the descending body adapted to ascend and descend along said stanchions, (d) an oscillating member that holds the oscillating body to the descending body, said oscillating member adapted to oscillate and tilt said oscillating body on the plane including the descending plane of the band saw, (e) a feed member, one end of which is fixedly mounted to the base and the other end of which is mounted to said descending body, said feed member controlling the descent speed or descent dimension of the descending body, (f) an oscillating drive member, and (g) means to cause the feed member to descend a feed amount when the band saw is proximate the periphery of the workpiece, the angle of the oscillating member relative to horizontal then being at a maximum.

7. A machine for cutting by automatic band saw as defined in claim 6 wherein said feed member is a fluid pressure cylinder provided in parallel to said guide stanchions.

8. The machine for cutting a workpiece by automatic band saw as defined in claim 7 wherein the means to cause the feed member to descend comprises control valve means to control the back pressure in the drainage flow path of the cell on the head side of the fluid pressure cylinder, a directional control valve in the drainage flow path, said directional control valve being in series with and upstream of said control valve means, and signal detection means operative to actuate said directional control valve.

9. A machine for cutting by automatic band saw as defined in claim 8 wherein said feed member comprises a fluid pressure cylinder which is provided in parallel to said guide stanchions with one end thereof fixed on said base and a plate cam whose outer periphery slidably contacts the other end of said fluid pressure cylinder with its shaft rotatably installed to said descending body to rotate synchronously with the oscillating and tilting motions of said oscillating body.

10. A machine for cutting by automatic band saw as defined in claim 9 wherein said plate cam has a concaved portion at at least one place on the outer periphery and smoothly curved portions at adjacent areas to said concaved portion with gradually increasing radius.

11. A machine for cutting by automatic band saw as defined in claim 6 or claim 8 wherein said oscillating member comprises a pair of suspending arms rotatably connecting oscillating shafts provided on both sides of said descending body and another oscillating shafts provided at both sides of said oscillating body respectively.

12. A machine for cutting by automatic band saw as defined in claim 10 or 8 wherein said oscillating body comprises rails for oscillation provided on said descending body and one or a plurality of guide rollers provided on both sides of said oscillating body capably of moving along said rails for oscillation.

13. A machine for cutting by automatic band saw as defined in claim 12 wherein said oscillating drive member comprises a crank having a crank plate provided to said descending body and carrying out rotative drives, and a connecting rod rotatably connecting a shaft provided at an eccentric position of said crank plate with a shaft provided to said oscillating body.

14. The machine as defined in claim 8 wherein the control valve means is a pressure-compensated flow control valve.

15. The machine as defined in claim 13 wherein the signal detection means comprises opposed projections provided on the outer peripheral surface of the crank plate at right angles to the position of the shaft eccentric to the crank plate, and a limit switch activated by contact with said projections, whereby when contact is made a solenoid in the directional control valve is actuated.

* * * * *